May 31, 1955  J. T. JANDRIS  2,709,556
AIRCRAFT EJECTION SEAT
Filed Feb. 27, 1952  4 Sheets-Sheet 1

INVENTOR
JOSEPH T. JANDRIS,
BY
ATTORNEY

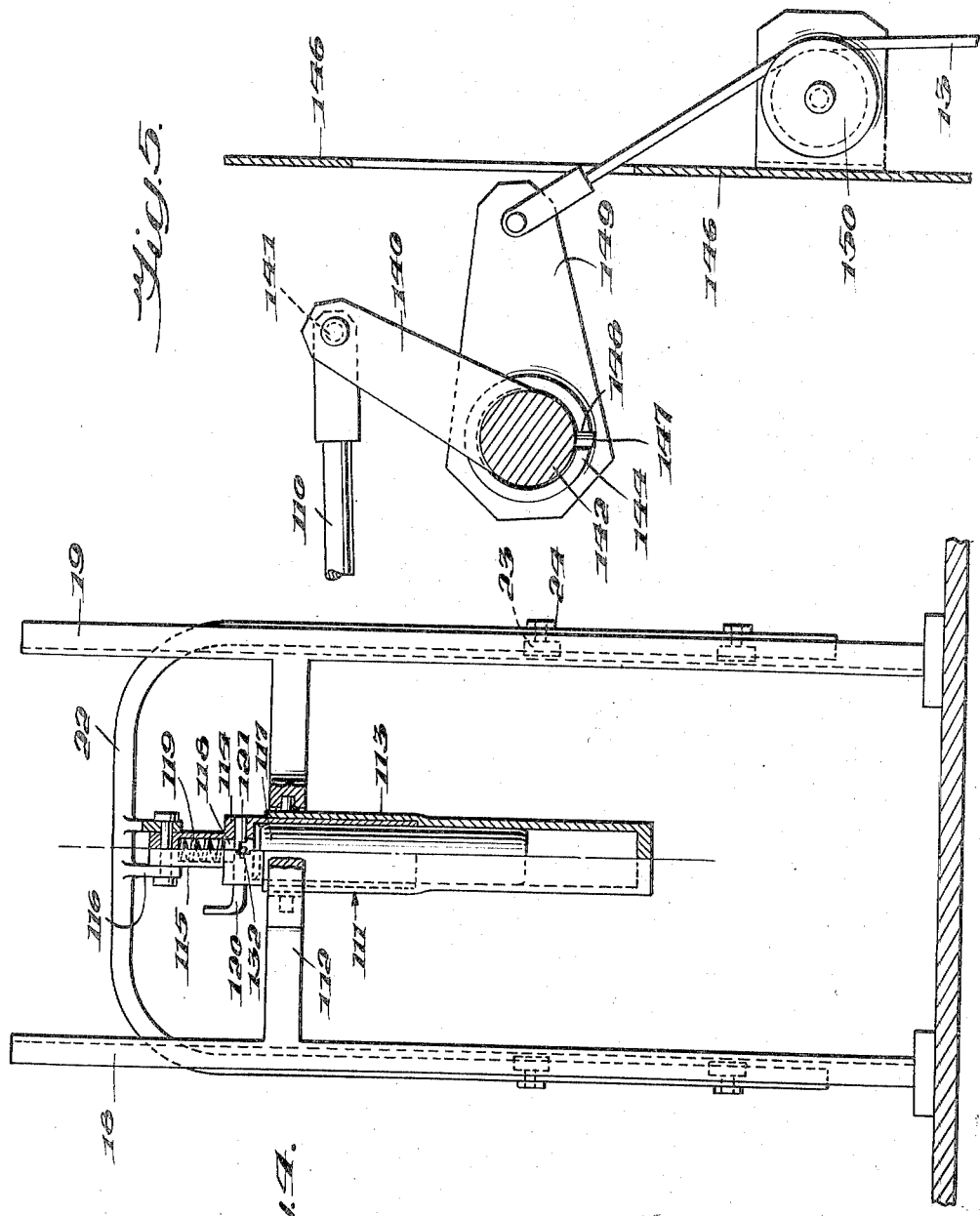

United States Patent Office 2,709,556
Patented May 31, 1955

2,709,556

AIRCRAFT EJECTION SEAT

Joseph T. Jandris, Springfield, Pa., assignor to The Glenn L. Martin Company, Middle River, Md., a corporation of Maryland Application February 27, 1952, Serial No. 273,604

8 Claims. (Cl. 244—122)

This invention relates generally to aircraft and more particularly to an improved ejection seat and mechanism for sequentially ejecting a plurality of such seats.

In order to insure proper ejection from high speed aircraft, the seat must move clear of the aircraft structure substantially instantaneously. This requires a tremendous initial acceleration which places considerable strain on the seat occupant. It is therefore desirable that the seat provide support for the limbs of the occupant as well as his body in order to prevent injury.

Controlled body movement during ejection obviously cannot be expected due to the high accelerations, and the time interval between operation of the ejecting control levers and actual ejection is too short to permit movement in the interim. Therefore it is necessary to locate the control levers where they may be actuated while the occupant is in the proper position for ejection.

To provide proper ejection and prevent inadvertent operation of the control mechanisms, interlocking means which requires a definite control actuating procedure should be provided. If the seat should be ejected before the canopy is released, or too soon after it is released so as to cause a collision, serious injury to the occupant would result. Where a plurality of seats are used, care must also be taken to prevent simultaneous ejection.

An object of this invention is to provide sequentially operable actuating means for plural ejection seats wherein the necessary operations are caused to be performed in a predetermined order to prevent simultaneous and improper ejection.

Another object of this invention is to provide an ejection seat having ejection control levers forming a part of arm rests adapted to reduce the effort required to effect ejection and to safely permit high accelerations without injury.

Still another object of this invention is to provide an ejection seat having a movable arm rest adapted to allow easy access to the seat in close quarters.

Further and other objects will become apparent from the accompanying description and drawings which form a part of this disclosure and in which like numerals refer to like parts.

In the drawing:

Fig. 4 is a rear view of the ejection seat showing the catapult and supporting arrangement.

Fig. 5 is a sectional view of the canopy cable actuating mechanism shown in Fig. 2.

Figure 1:
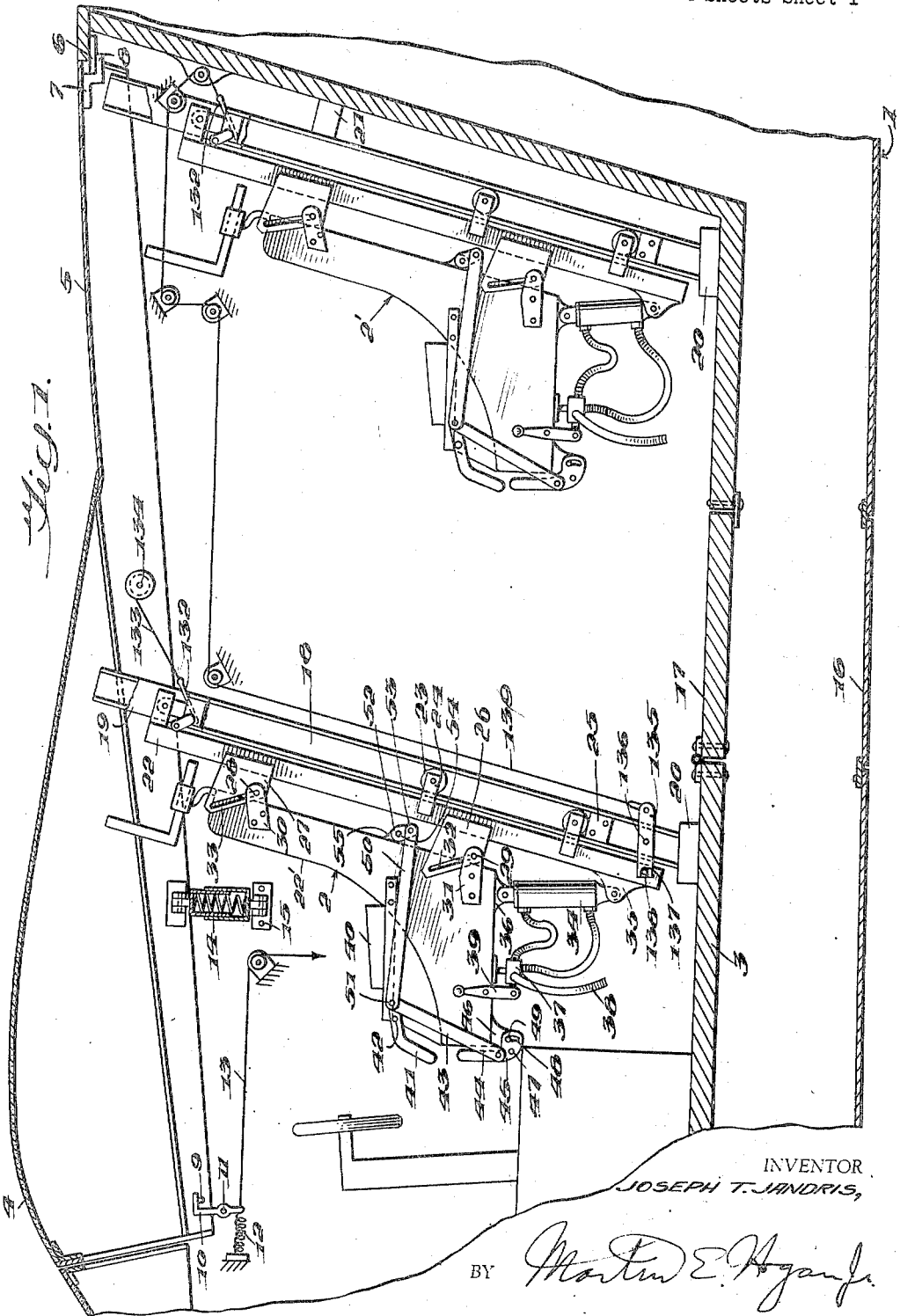
Fig. 1 is a schematic sectional side view of a portion of an aircraft showing the ejection seat installation forming a part of this invention.

Fig. 1 shows an aircraft 1 fitted with a pair of ejection seats 2 and 2' arranged in tandem within cabin 3. A canopy 4 which includes a portion of fuselage skin 5 on the upper surface of the fuselage is releasably secured to the aircraft so as to enclose the cabin and complete the external configuration. As schematically shown in the drawing, releasable canopy 4 is suitably secured at its rearwardmost end such as by a projection 6 rigidly carried by the aircraft fuselage and by a bracket 7 carried by the canopy. Bracket 7 is provided with a tip portion 8 adapted to interlock with projection 6. The forward portion of canopy 4 is provided with suitable hold down means such as pin 9 for engaging a latch 10 pivotally secured to the fuselage wall through pin 11. Latch 10 is urged into locking position shown in Fig. 1 through a spring 12 connecting at one end to the latch and at its opposite end to a fixed portion of the aircraft. By pulling canopy release cable 13, it is seen from the drawing that latch member 10 will disengage pin 9 and release the canopy. A compression spring 14 is carried by the aircraft on a suitable bracket arrangement 15 so as to urge canopy 4 upwardly and into the airstream when latch 10 is released.

Normal entrance to the cabin is made from the underside of the aircraft through doors 16 and 17; the releasable canopy being intended for use only in case of ejection.

Figure 2:
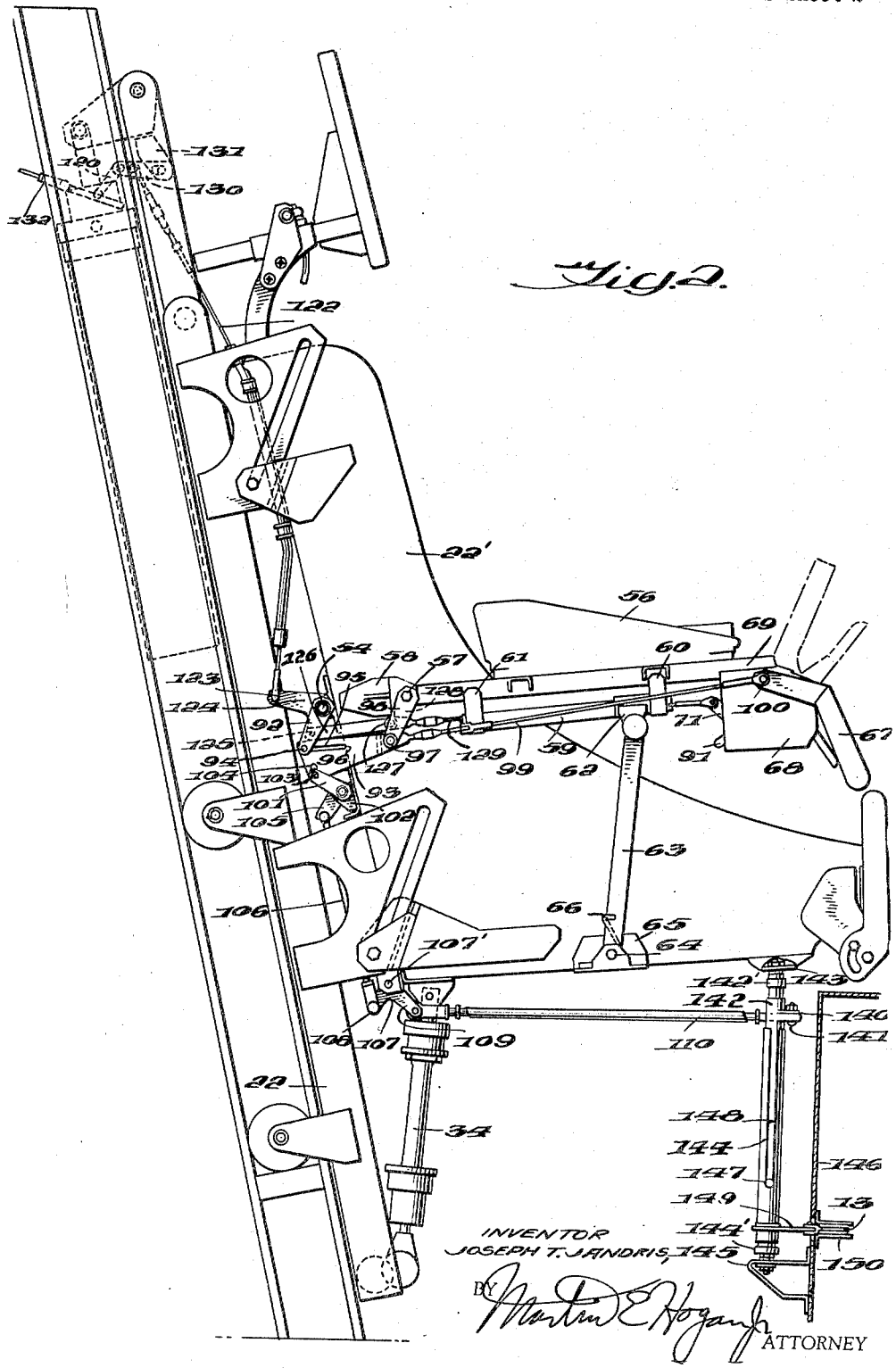
Fig. 2 is a right side view of one of the ejection seats shown in Fig. 1 forming a part of this invention.

The ejection seats 2 and 2', as best shown in Figs. 1 and 2, each employ a pair of guide rails 18 and 19 which are U-shaped in cross section. These guide rails are fixedly secured to the aircraft by suitable brackets such as indicated by reference characters 20 and 21 so as to extend upwardly and rearwardly. The position of rails 18 and 19 is most important since the trajectory of the seats during ejection is determined thereby. A seat frame 22 is supported by guide rails 18 and 19 through rollers 23 carried by brackets 24 secured to the seat frame. As shown in the drawing, two rollers are provided on each side of seat frame 22, and are spaced apart so as to allow only parallel movement thereof relative to the guide rails. Suitable blocks 25 are secured to guide rails 18 and 19 to establish the lowermost position of seat frame 22. Brackets 26 and 27 are secured to each side of seat frame 22 so as to extend forwardly thereof and support a seat pan 22' through pins 28 and 29 carried by brackets 30 and 31. To permit raising and lowering the seat relative to seat frame 22, brackets 26 and 27 engage pins 28 and 29 through slots 32 and 33. By having slots 32 and 33 slope upwardly and forwardly, the seat will be caused to take a corresponding path. Any direction of seat movement desired may be obtained by simply selecting the proper slot slope.

To raise seat pan 22' from the lowermost position shown in Fig. 1 relative to seat frame 22, a hydraulic cylinder 34 is pivotally secured at one end to a bracket 35 forming a part of seat frame 22, and at its opposite end to a bracket 36 forming a part of seat pan 22'. It is seen that by actuation of cylinder 34, the seat may be moved to any desired position within the limits of slots 32 and 33. Valve 37, carried by seat pan 22', controls the flow of hydraulic fluid into actuating cylinder 34. Valve 37 may be controlled such as by a hand lever 39 pivotally carried on seat pan 22'. Fluid line 38 communicates with a suitable hydraulic pressure source (not shown) to provide the pressure necessary for actuation of the cylinder. To permit unrestrained ejection of the seat where the pressure source is fixed to the aircraft structure, a conventional quick disconnect fitting (not shown) may be employed in fluid line 38.

The left hand side of the seat shown in Fig. 1 is provided with an arm rest 40 rigidly secured to seat pan 22'. A hand lever 41 is pivoted at 42 to the forward end of arm rest 40 so as to form an extension thereof. Lever 41 pivotally connects with one end of a foot rest positioning rod 43 through pin 51. The opposite end 44 of rod 43 pivotally connects with foot rest 45. Foot rest 45 is adapted to swing from the stowed position shown in Fig. 1 to a forwardly extending supporting position by pulling lever 41 to a generally upwardly extending position. Foot rest 45 is pivotally carried at 47 by a bracket 46 secured to seat pan 22'. To limit the movement of foot rest 45 from a stowed to an extended position, an arcuately shaped slot 48 is provided therein for engaging pin 49 carried by bracket 46. As the foot rest pivots downwardly from the stowed position due to the movement of hand lever 41, pin 49 moves relative to slot 48 until it reaches the opposite extreme slot position.

A lock actuating arm 50 pivotally connecting at one end with hand lever 41 through pin 51 pivotally engages, at its opposite end, a crank arm 52 through pin 53 for actuating ejection sequencing means described in detail later on in this specification. Crank arm 52 is rigidly secured to a shaft 54 which extends transversely of the back side of seat pan 22' from the left to the right hand side. Shaft 54 is rotatably carried by suitable brackets 55, secured to seat pan 22'. It is seen from Fig. 1 that by raising hand lever 41, shaft 54 will be caused to rotate, thereby unlocking the control levers on the right hand side of the seat as hereinafter described.

Referring now to the right hand side of seat 2 as shown in Fig. 2, it is seen that this side of seat pan 22' is carried by seat frame 22 through a bracket arrangement identical to the bracket arrangement on the left hand side of the seat as shown and described in connection with Fig. 1. The right hand arm rest 56 is pivotally carried at its rearwardmost end through pin 57 secured to a bracket 58 on the seat pan. A tubular guide member 59 extending generally parallel with arm rest 56 and spaced therefrom is rigidly secured in position relative to the arm rest by means of brackets 60 and 61. A sleeve 62 carried by tubular member 59 is adapted to move axially along the member within the limits provided by brackets 60 and 61. Sleeve 62 pivotally connects with a lever 63 which is pinned at 64 to a bracket 65 secured to seat pan 22' whereby to control the pivotal movement of arm rest 56. When sleeve 62 is moved along tubular member 59 to a position abutting bracket 61, it is obvious from Fig. 2 that arm rest 56 will have moved to a generally downwardly extending stowed position permitting access to the seat from the side rather than from the front as would be required were the arm rest not movable from the position shown in Fig. 2. To prevent arm rest 56 from being inadvertently moved out of its generally forwardly extended position shown in Fig. 2, a spring 66 is carried by pin 64 so as to urge arm 63 into its most forward position wherein sleeve 62 abuts bracket 60.

Figure 3:
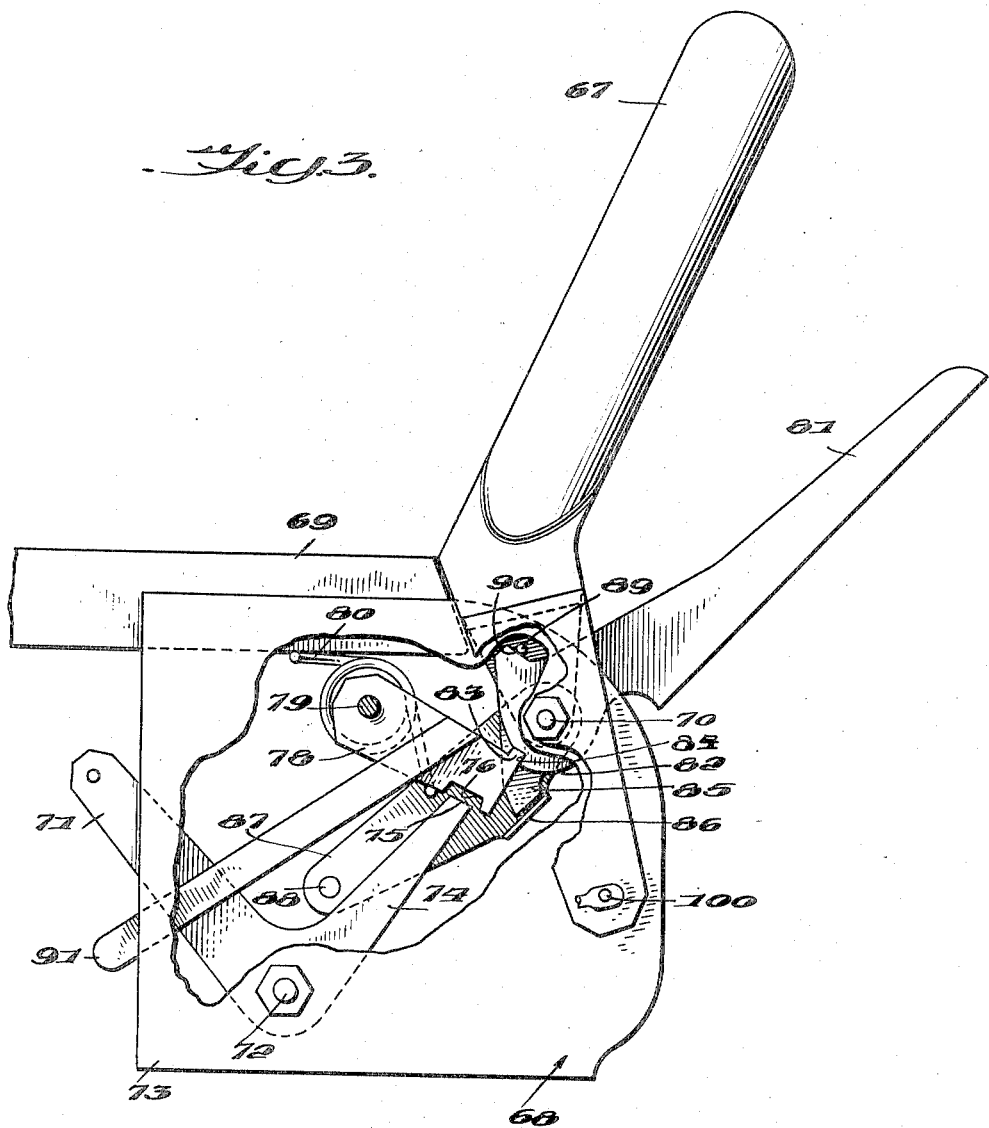
Fig. 3 is a fragmentary side view of the ejection control trigger mechanism.

A hand lever 67 and trigger mechanism 68 is carried on the forward portion 69 of right hand arm rest 56 for performing the operations necessary for ejection. As best shown in Fig. 3, hand lever 67 is pivotally carried by pin 70 for movement from the stowed position shown in Fig. 2 to the position shown in Fig. 3. Trigger mechanism 68 includes a bell crank-like member 71 pivotally carried by pin 72 secured to the trigger mechanism housing 73 forming a part of the forward portion of arm rest 56. One arm 74 of bell crank 71 is adapted to have its tip portion 75 engage a notch 76 formed in a lever 78 for locking the bell crank in the position shown in Fig. 3 so long as tip portion 75 is in engagement with notch 76. Lever 78 is pivotally supported by pin 79 and urged to a position unlocking bell crank 71 by means of a spring 80 carried by pin 79. The trigger lever 81, pivotally carried by pin 70, is provided with a cam 82 which engages a projection 83 formed on lever 78 so as to maintain lever 78 in a position locking bell crank 71 until trigger 81 has been moved into the position shown in Fig. 3 wherein a recess 84 formed in the cam permits lever 78 to move upwardly as urged by spring 80. When trigger 81 has moved to this position, unlocking bell crank 71, a pawl 85 rigidly carried by the trigger lever, contacts an abutment 86 provided on lever 87. One end of lever 87 is pivotally carried by pin 70 and its opposite end is provided with a projection 88 which engages arm 74 of bell crank 71. Further rotation of trigger lever 81 causes rotation of lever 87 and hence rotational movement of bell crank 71. A pin 89, carried by hand lever 67 is adapted to engage an abutment 90 formed on trigger lever 81, so that when lever 67 is moved from the position shown in Fig. 2 to the position shown in Fig. 3, trigger lever 81 will be rotated to the unlocked position automatically so as to be ready for actuation. In the event it is found desirable to lock the trigger after it has been moved to the unlocked position, a manually operable locking lever 91 is rigidly attached to lever 78 for causing rotation thereof into the locked position, thereby allowing trigger lever 81 to be swung downwardly about its pivot 70 so that the cam-like surface 82 engages projection 83.

Sequencing means preventing actuation of right hand control lever 67 and trigger lever 81 until after the left hand lever 41 has been actuated is provided by a linkage arrangement including crank arm 92 connecting with shaft 54 extending from the left hand side of the seat. A triangular shaped slotted link or locking member 93 engages a pin 94 carried by crank arm 92 through a slot 95 in such a manner as to prevent forward motion of link 93 until crank arm 92 has been rotated so as to move pin 94 out of engagement with the rear end of slot 95. Such rotation of crank arm 92 is accomplished by actuating left hand control lever 41 to lower the foot rest 45 as previously described. Link 93 is supported at one end by a pin 97 carried on an idler arm 98 pivotally secured to seat pan 22' through pin 57. A flexible cable 99 connects at one end to link 93 through pin 97 and at its opposite end to hand lever 67 through pin 100 so that by raising hand lever 67, link 93 is caused to move forwardly. Forward movement of link 93 causes bell crank 101, pivotally carried by a bracket 102 forming a part of seat pan 22' to rotate. The connection between bell crank 101 and link 93 is made by a pin 103 and slot 104 arrangement which permits rotational movement of crank arm 92 to the unlocking position without binding. Arm 105 of bell crank 101 pivotally connects with one end of rod 106 which connects at its opposite end to a bell crank 107 through pin 108. Bell crank 107 is pivotally carried by seat pan 22' through pin 107'. Arm 109 of bell crank 107 pivotally connects with one end of an actuating rod 110. The opposite end of rod 110 pivotally connects at 141 with a crank arm 140 fixedly secured to shaft 142 forming a part of the canopy cable actuating mechanism located adjacent the forward end of seat pan 22', as shown in Fig. 2. One end 142' of shaft 142 connects with a bracket 143 secured to seat pan 22'. A conventional ball and socket arrangement (not shown) within end portion 142' of shaft 142 permits free angular and rotational movement of the shaft relative to bracket 143. One end of shaft 142 is adapted to be telescopically received within a tube 144 secured at one end to a bracket 145 formed rigid with the cabin floor structure 146. Tube 144 is likewise provided with a conventional ball and socket arrangement (not shown) within end portion 144' permitting free angular and rotational movement thereof relative its supporting bracket 145. Relative rotational movement between shaft 142 and tube 144 is prevented by means of a pin 147, carried by shaft 142, which is arranged to engage an open ended slot 148 formed in tube 144 as shown in Figs. 2 and 5. A crank arm 149, rigidly carried by tube 144, connects with one end of flexible cable 13. The opposite end of cable 13 connects with canopy release latch 10 as shown in Fig. 1. As right hand lever 67 on arm rest 56 is raised, the mechanism described above causes rotational movement of crank arm 149 so as to pull on cable 13 and thereby release the canopy. Pulleys such as pulley 150, secured to floor structure 146 adjacent crank arm 149, are employed to direct cable 13 through protected areas within the aircraft so as to prevent inadvertent actuation of the canopy release latch.

Shaft 142 and tube 144 being axially movable relative to each other and angularly movable relative to the supporting brackets 143 and 145, allows seat pan 22' to be raised and lowered within the limits of the slotted brackets 26 and 27 without binding and without affecting the operation of the cable actuating mechanism. Open-ended slot 148 permits shaft 142 to become completely disengaged from tube 144 carried by the aircraft structure so as not to restrain the seat during ejection.

The ejection seat catapult 111, as best shown in Figure 4 is carried by a cross member 112 rigidly connecting with guide rails 18 and 19. Catapult 111 includes an outer sleeve 113 having one end thereof closed and its opposite end open and adapted to telescopically receive an inner sleeve member 114. Sleeve member 114 is provided with a hollow extension 115 which pivotally connects with a bracket 116 forming a part of seat frame 22. A cartridge 117 containing propellant for ejecting the seat is carried within sleeve members 113 and 114, and is adapted to be detonated by a firing mechanism carried within the inner sleeve member 114. This firing mechanism includes a firing pin 118 and compression spring 119 carried within the hollow extension 115. By allowing pin 118 to be forced downwardly by action of compression spring 119 so as to contact the cartridge 117, the cartridge is detonated, thereby causing the seat to be ejected from the aircraft. A firing control arm 120, extending transversely through 114, prevents firing pin 118 from contacting cartridge 117 until arm 120 is rotated to a position whereby an arcuately shaped groove 121 formed therein is aligned with the direction of movement of firing pin 118, at which time arm 120 no longer obstructs the movement of firing pin 118, allowing it to move downwardly and strike the cartridge.

Actuation of firing control arm 120 is accomplished by means of a cable 122 connecting with the trigger mechanism 68 through a lever arrangement pivotally carried by seat pan 22' as shown in Fig. 2. One arm 123 of a bell crank 124 pivotally carried by shaft 54 pivotally connects with one end of cable 122 while the other arm 125 of the bell crank pivotally connects with an arm 126. Arm 126 is pivotally connected at its opposite end 127 to an idler arm 128 pivotally carried by pin 57. A cable 129 connects at one end to arm 126 and at its opposite end to trigger mechanism bell crank 71. As shown in Fig. 2, firing control arm 120 connects with cable 122 through a lever 130 pivotally supported at one end to a bracket 131 carried by seat frame 22. By pulling cable 122, lever 130 and firing control arm 120 are rotated so as to cause detonation of the charge and hence ejection of the seat.

To prevent untimely actuation of firing control arm 120, an arming pin 132 is adapted to be received within member 114 transversely of firing control arm 120 and in contact with groove 121 so as to prevent rotation of the firing control arm until after arming pin 132 has been removed, as best shown in Fig. 4. Firing pin 132 on the forward ejection seat 2, as shown in Fig. 1, connects with a cable 133, wound around a spring loaded reel 134 carried by a canopy 4. Reel 134 permits the canopy to be released and moved a short distance from the aircraft before sufficient force is applied to arming pin 132 to cause its removal. This arrangement prevents ejecting the seat until after the canopy has moved a safe distance from the seat trajectory.

Arming pin 132 for the rear ejection seat 2', as shown in Fig. 1, is removed by movement of the forward seat 2 relative to its guide rails during ejection. This is accomplished by means of a rocker arm 135 pivotally carried by guide rail 18 through a pin 136. One end of rocker arm 135 is provided with a notch 137 adapted to engage a pin 138 carried by seat frame 22. The other end of rocker arm 135 connects with a cable 139. Cable 139 is guided over a suitable pulley arrangement such as is schematically shown in Fig. 1 and through protective structure (not shown) within the aircraft so as to connect with the rear seat arming pin 132. As the forward seat moves along guide rails 18 and 19, rocker arm 135 is caused to pivot about pin 136, pulling on cable 139 and thereby removing the rear seat arming pin 132 to permit ejection of the rear seat. This arrangement prevents simultaneous ejection of the seats.

As previously mentioned, entrance into cabin 3 is normally made through doors 16 and 17 forming a part of the aircraft structure as shown in Fig. 1. The structural arrangement provides ready access to the rear seat 2', however, the forward seat 2 can be reached only through the space available between the ejection seat and the fuselage wall. Therefore, to permit a smaller and more efficient fuselage shape while maintaining sufficient space for access to seat 2, the right hand arm rest is pivotally supported as previously described so as to be movable from the normal to a stowed position. With the arm rest in the stowed position, entrance to the seat may readily be made from the side rather than from the front as would otherwise be necessary. It is also to be noted that the location of the actuating linkages connecting with the hand control levers forming the forward portion of the arm rest are such as to permit pivotal movement of the arm rest without causing their actuation. After the occupant is seated, the arm rest is raised to the normal forwardly extending position to provide support.

To eject the seats, the occupant in the forward seat first pulls lever 41 pivotally carried by the left hand arm rest 40 so as to lower the foot rest 45 into its supporting position and also to rotate shaft 54 so as to unlock the right hand control lever 67. Right hand control lever 67 is then pulled upwardly causing rotation of shaft 142 and hence rotation of crank arm 149 so as to unlock the canopy release lever 10 by pulling cable 13. By raising hand lever 67, trigger mechanism 68 is also unlocked, but still inoperative to eject the seat until after the arming pin 132 has been pulled from the catapult firing mechanism by cable 133 connected to the canopy. After the canopy is released and arming pin 132 is removed, trigger lever 81 may be pulled, causing rotation of bell crank 71 in mechanism 68 so as to pull on cable 122 and thereby rotate firing control arm 120 to permit detonation of the ejecting charge. As the forward seat leaves its guide rails 18 and 19, rocker arm 135 is caused to rock about pin 136, removing arming pin 132 on the rear seat 2'.

The necessary operations for ejecting the rear seat are substantially the same as those recited for the ejection of the forward seat with the exception of the canopy release mechanism, which is carried only on the forward seat. The left hand control lever is employed to lower the foot rest and unlock the right hand control lever. Actuation of the right hand control lever unlocks the trigger mechanism and permits the rear seat occupant to actuate the trigger lever for detonating the charge carried in the rear seat catapult for causing ejection.

As set forth in the foregoing description, every operation necessary for seat ejection is only effective when performed in a definite and proper sequence. This sequencing eliminates the dangers present were it possible to eject the seats too soon after releasing the canopy or ejecting the seats simultaneously.

It is to be understood that certain changes, alterations, modifications and substitutions can be made without departing from the spirit and scope of the appended claims.

I claim as my invention:

1. In an aircraft having a fuselage, an opening formed therein and a releasable canopy for closing said opening, an ejection seat carried within said fuselage adjacent said opening and arranged to be ejected therethrough comprising, a catapult connecting with said seat and said aircraft and including a firing mechanism adapted to cause said catapult to eject said seat when actuated, a pair of arm rests carried by said seat and having control levers forming the forward ends thereof, one of said arms being pivotally carried for movement to a stowed position to facilitate access to said seat, a retractable foot rest normally carried by said seat in a retracted position and connecting with one of said control levers for movement into a supporting position upon actuation of said one lever, sequencing means connecting said control levers for locking the other of said levers in position until after said one lever is actuated, a canopy release latch carried by said aircraft for locking said canopy in position closing said fuselage opening, means connecting one of said other levers with said canopy release latch for releasing said canopy upon actuation thereof, means connecting another of said other levers with said firing mechanism for causing actuation thereof to eject said seat, and means associated with said last mentioned lever preventing actuation thereof until after said canopy is released.

2. In an aircraft having a fuselage and an opening formed in the top wall thereof, a releasable canopy for closing said opening, a pair of ejection seats carried within said fuselage adjacent said opening and arranged to be ejected therethrough, each said seat including an ejection catapult, a firing mechanism connecting with each said catapult for causing operation thereof to eject said seat, means associated with one of said seats for releasing said canopy and allowing it to be blown free of said fuselage so as to provide an opening through which said seats may be ejected, trigger means carried by each said seat for actuating its firing mechanism, trigger locking means carried by each said seat, said trigger means being operative only in response to actuation of said trigger locking means, said trigger locking means carried by one of said seats being responsive to relative movement between said canopy and said fuselage and said trigger locking means carried by the other of said seats being responsive to relative movement between said one seat and said fuselage whereby to prevent simultaneous ejection.

3. In an aircraft having a fuselage and an opening formed in the top wall thereof, a releasable canopy for closing said opening, a pair of ejection seats carried within said fuselage adjacent said opening and arranged to be ejected therethrough, each said seat including an ejection catapult, a firing mechanism connecting with each said catapult for initiating operation thereof to eject said seats, arm rests carried by said seats and having control levers forming the forward ends thereof, one of said arm rests being pivotally carried for movement to a stowed position to facilitate access to said seat, canopy release means connecting with one of said control levers and with said canopy for releasing the latter whereby it may be blown free of the aircraft, means for actuating said firing mechanism connecting with other of said control levers for ejecting said seats, and arming means for locking said firing mechanism to prevent premature or simultaneous ejection of said seats, said arming means for one of said seats connecting with said canopy and being responsive to relative movement therebetween for unlocking said firing mechanism associated with said one seat whereby to permit actuation thereof only after releasing said canopy, and said arming means for the other of said seats connecting with said one seat and said aircraft and responsive to the movement of said one seat during ejection for unlocking said other firing mechanism whereby to permit actuation thereof only after ejecting said one seat.

4. An ejection seat for aircraft comprising guide rails carried by said aircraft, a seat frame, rollers carried by said seat frame and adapted to positively engage said guide rails, an ejection tube including a firing mechanism connecting with said seat frame and said aircraft, a seat pan carried by said seat frame, a pair of arm rests carried by said seat pan one of which is adapted to pivot from a generally normal position to a stowed position, a lever pivotally carried by each said arm rest adjacent the forward end thereof, a shaft rotatably carried by said seat, an arm fixedly attached to each end of said shaft, one of said arms connecting with said lever on one of said arm rests so as to cause rotation of said shaft upon actuation of said lever, an idler arm pivotally carried by said seat, a locking member pivotally carried by said idler arm, said locking member having a pair of slots extending generally normal to each other, the other arm on said shaft connecting with said locking member through one of said slots so as to prevent forward motion of said locking member relative to said seat until said shaft is rotated upon actuation of said first mentioned lever connecting therewith, a bellcrank pivotally carried on said seat and connecting with said locking member through said other slot for rotational movement upon forward motion of said locking member, means connecting with said locking member and with the other of said levers for causing said forward motion of said locking member by actuating said other lever, means operatively controlled by said bellcrank for arming said firing mechanism, and a trigger pivotally carried by the associated arm rest adjacent said other lever for firing said firing mechanism and thereby ejecting said seat.

5. In an aircraft having a fuselage, an opening formed therein and a releasable canopy for closing said opening, an ejection seat carried within said fuselage adjacent said opening and arranged to be ejected therethrough comprising, a catapult connecting with said seat and said aircraft, said catapult including a firing mechanism adapted to cause said catapult to eject said seat when actuated, means carried by said seat for actuating said firing mechanism to eject said seat, an arm rest carried by said seat, a control lever forming the forward portion of said arm rest, a canopy release latch carried by said aircraft for locking said canopy in position closing said opening, a shaft rotatably carried by said seat and connected to said control lever for rotational movement in response to movement of said lever, a tube rotatably carried by said aircraft and adapted to telescopically receive said shaft for unlimited axial movement whereby to permit unrestrained seat ejection, means associated with said tube and shaft allowing only axial movement of said shaft relative to said tube whereby rotational movement of said shaft produces corresponding rotation of said tube, and means connecting with said tube and said canopy release latch responsive to rotational movement of said tube for actuating said latch and releasing said canopy.

6. In an aircraft having an occupant carrying compartment formed therein, an opening into said compartment and a releasable cover for closing said opening, a plurality of ejection seats carried by said aircraft within said compartment and arranged to be ejected through said opening comprising, catapult means connecting with each said seat and said aircraft for causing said ejection, a firing mechanism associated with said catapult means for controlling its operation and providing independent seat ejection, a cover release latch carried by said aircraft and adapted to release said cover upon actuation, manually operable means connecting with said latch for causing its actuation, firing mechanism actuating means carried by each said seat for causing its ejection, locking means associated with each of said last mentioned actuating means normally preventing actuation thereof, means connecting with one of said locking means and responsive to releasing said cover for unlocking the associated actuating means for one of said seats, and seat ejection sequencing means connected to the other locking means and responsive to relative movement between said seats for unlocking the other firing mechanism actuating means.

7. In an aircraft having a fuselage, an opening formed therein and a releasable canopy for closing said opening, an ejection seat carried within said fuselage adjacent said opening and arranged to be ejected therethrough comprising, a catapult connecting with said seat and said aircraft and including a firing mechanism adapted to cause said catapult to eject said seat when actuated, a pair of arm rests carried by said seat, one of said arm rests being pivotally carried for movement to a stowed position to facilitate access to said seat, a plurality of ejection control levers forming the forward ends of said arm rests, a retractable foot rest pivotally carried by said seat and adapted for movement from a normal retracted position to a supporting position, a canopy release latch carried by said aircraft for locking said canopy in position closing said fuselage opening, means operatively connecting said control levers with said firing mechanism, said foot rest and said canopy release latch for actuation thereof, and means operatively interconnecting said control levers for preventing operation thereof except in a predetermined sequence.

8. An ejection seat for aircraft adapted to permit a seat occupant to perform the necessary operations for ejection from a supported position comprising, a catapult connecting with said seat for effecting ejection upon actuation, a firing mechanism associated with said catapult and adapted to control the actuation thereof, a pair of arm rests carried by said seat and arranged to support the arms of an occupant, one of said arms being pivotally supported at one end for swinging movement from and to a stowed position to facilitate access to said seat, said one arm including a track extending generally parallel thereto, an arm brace swingably carried by said seat and slidably engaging said track for positively controlling the pivotal movement of said one arm, a control lever forming the forward portion of said one arm rest, and means including a flexible tension member connecting said control lever with said firing mechanism for causing its actuation upon operation of said control lever to eject said seat, said flexible member being so positioned relative to the pivotal support of said one arm rest as to become slack during movement of said arm rest to stowed position.

References Cited in the file of this patent

UNITED STATES PATENTS

| | | |
|---|---|---|
| 2,168,094 | Cozzitorto | Aug. 1, 1939 |
| 2,516,902 | Musser | Aug. 1, 1950 |
| 2,528,532 | Martin | Nov. 7, 1950 |